US005481250A

United States Patent [19]

Hano

[11] Patent Number: 5,481,250

[45] Date of Patent: Jan. 2, 1996

[54] CRT OPERATION APPARATUS

[75] Inventor: Kazumi Hano, Fuchu, Japan

[73] Assignee: Kabushiki Kaisha Toshiba, Kawasaki, Japan

[21] Appl. No.: 432,589

[22] Filed: May 1, 1995

Related U.S. Application Data

[63] Continuation of Ser. No. 180,814, Jan. 10, 1994, abandoned, which is a continuation of Ser. No. 829,528, Feb. 3, 1992, abandoned, which is a continuation of Ser. No. 552,549, Jul. 16, 1990, abandoned.

[30] Foreign Application Priority Data

Jul. 18, 1989 [JP] Japan .................................... 1-183564

[51] Int. Cl.$^6$ ........................................................ H04Q 1/00

[52] U.S. Cl. ......................... 340/825.06; 345/1; 345/133; 340/825.37

[58] Field of Search ......................... 340/825.06, 825.37, 340/825.08; 345/1, 10, 133, 146; 341/23; 370/13

[56] References Cited

U.S. PATENT DOCUMENTS

| | | | |
|---|---|---|---|
| 4,413,314 | 11/1983 | Slater et al. | 340/706 |
| 4,726,017 | 2/1988 | Krum et al. | 340/825.08 |
| 4,745,744 | 5/1988 | Cherry et al. | 340/825.06 |
| 4,774,510 | 9/1988 | Steinke | 340/825.06 |
| 4,788,647 | 11/1988 | McManus et al. | 340/825.06 |
| 4,818,993 | 4/1989 | Stöckel | 340/825.06 |
| 4,962,473 | 10/1990 | Crain | 340/825.37 |
| 4,990,888 | 2/1991 | Vogt et al. | 340/825.06 |

FOREIGN PATENT DOCUMENTS

| | | |
|---|---|---|
| 55-035006 | 3/1980 | Japan . |
| 64-79802 | 3/1989 | Japan . |

OTHER PUBLICATIONS

Japanese Patent Disclosure (Kokai) No. 62–224810; T. Niihashi et al.: Mar. 26, 1986.

*Primary Examiner*—Brian Zimmerman
*Attorney, Agent, or Firm*—Oblon, Spivak, McClelland, Maier & Neustadt

[57] ABSTRACT

A CRT operation apparatus comprising a CRT display for displaying an image of a plant, including the icons of the terminal devices incorporated in the plant, a low-rank controller for controlling the terminal units, and a high-rank controller for supplying various operation commands to the low-rank controller through a network. When an operator selects one of the icons displayed by touching the CRT display screen, thus selecting the corresponding terminal unit, the high-rank controller collects the first data item representing the condition of the selected terminal unit and the second data item representing the condition of that switch of a central control panel which has been operated to control the selected terminal unit, and supplies both data items in the form of an operable-signal or an abnormal-signal to the CRT display. The CRT display displays data showing whether or not the selected terminal unit can be operated further, in accordance with the signal. Looking at the screen of the CRT display, an operator can understand whether the terminal unit he or she has selected can be operated further or not.

5 Claims, 6 Drawing Sheets

CRT OPERATION APPARATUS

This application is a Continuation of application Ser. No. 08/180,814, filed on Jan. 10, 1994, now abandoned, which is a continuation of Ser. No. 07,829,528, filed on Feb. 3, 1992, now abandoned, which is a continuation of Ser. No. 07/552,549, filed on Jul. 16, 1990, now abandoned.

BACKGROUND OF THE INVENTION

1. Field of the Invention

The present invention relates to a CRT operation apparatus which comprises a CRT monitor and is designed to monitor and controls a plant by means of the CRT monitor.

2. Description of the Related Art

Generally, plants, such as a power-generating plant, have hitherto been monitored and controlled by operating the various control panels, such as a BTG Boiler Turbine Generator) panel and an auxiliary BTG panel, which are installed in a central control room. Recently, due to the advance in CRT technology, there is a trend toward using a CRT operation apparatus having a CRT display, either in combination with the control panels, or as main component of a monitor/control system, in order to monitor and control a power-generating plant.

when the CRT operation apparatus is used in combination with the conventional control panels, however, it is impossible to determine whether or not any terminal unit of the plant, which has been selected by operating the CRT operation apparatus, can be further operated normally in case this terminal unit control Aux.) has an electrical trouble and/or any other trouble.

Also, when the CRT operation apparatus is set in a central control room and used in combination with various control panels also set up in the central control room, in order to monitor and control a plurality of terminal units incorporated in the plant, it is impossible to determine whether or not the switches of the central control panel, which are remote from the terminal uuits, are such conditions as to adversely influence the CRT operation apparatus.

SUMMARY OF THE INVENTION

The object of the present invention is to provide a CRT operation apparatus having a CRT display, which enables an operator to select one of the terminal units of a plant by selecting the corresponding one of the cons displayed by the CRT display, to understand whether or not the selected unit has a trouble and what trouble it has, and to determine whether or not the switches of a central control panel installed in a central control room for controlling the terminal units and, hence, located remote from the terminal units are such conditions as to adversely influence the terminal units.

According to the invention, there is provided a CRT operation apparatus comprising: a CRT display for displaying an image of a plant, including the icons of the terminal devices incorporated in the plant; a low-rank controller for controlling the terminal units; and a high-rank controller for supplying various operation commands to the low-rank controller through a network.

When an operator selects one of the icons displayed by the CRT display, thus selecting the corresponding terminal unit, the high-rank controller collects the first data item representing the condition of the selected terminal unit and the second data item representing the condition of that switch of a central control panel which has been operated to control the selected terminal unit, and supplies both data items in the form of a permission-signal or an abnormal-signal to the CRT display. The CRT display displays data showing whether or not the selected terminal unit can be operated further, in accordance with the signal. Looking at the screen of the CRT display, an operator can understand whether the terminal unit he or she has selected can be operated further or not.

More specifically, when the operator selects one of the terminal units, the high-rank controller collects the first data item and the second data item, and determines whether or not the selected unit has a trouble. If the unit is found to have a trouble, the high-rank controller supplies an abnormal-signal to the CRT display. In response to the abnormal-signal, the CRT display displays an abnormal message (e.g., abnormal unit status), whereby the operator understand that the unit should not be operated further.

In the meantime, when the operator performs CRT operation, thus designating the detection of the condition of that switch of central control panel which has been operated to control the selected terminal unit, the high-rank controller collects the data item representing the condition of the switch from an interface device through the low-rank controller. If it is determined, from this data item, that the switch is in normal position (i.e., a pull rock position), the terminal device can De controlled. If the switch is found to be in an abnormal position, the high-rank controller cause the CRT display to display an error message. Seeing this message displayed, the operator takes steps necessary to set the switch in a normal position.

Therefore, when the operator performs CRT operation, thereby selecting one of the terminal units which he or she wish to control, the CRT display displays not only the data showing whether the selected unit in normal condition or not, and but also the data indicating whether the corresponding switch of the central control panel is in normal condition or not. These data items displayed enables the operator to accomplish a high-reliability control of the plant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
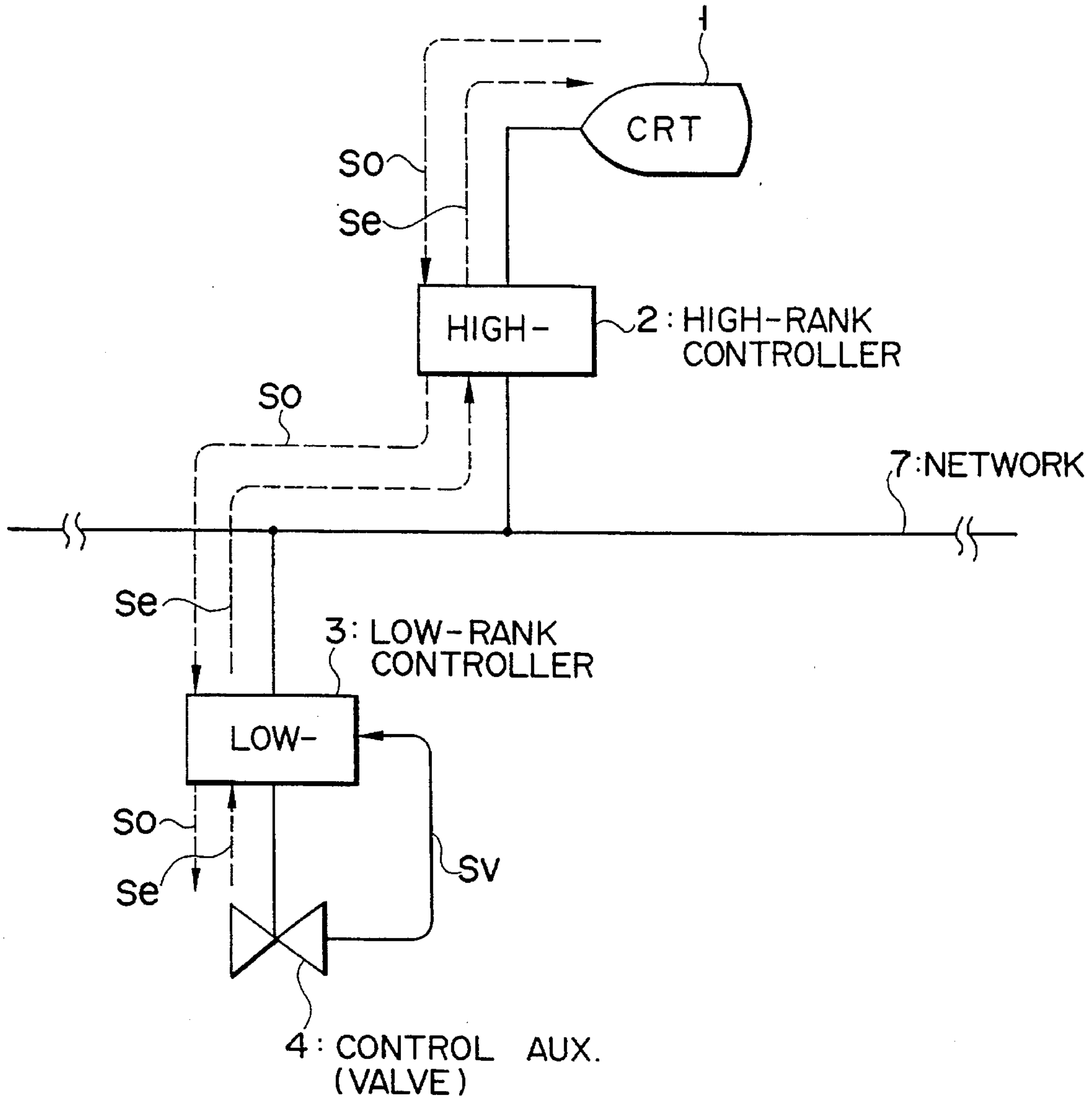
FIG. 1A is a diagram representing the basic units of a CRT operation apparatus according to the present invention.

FIG. 1A represents the simplest possible configuration of a CRT operation apparatus according to the invention, which is designed for use in a system for monitoring and controlling a plant such as a power-generating plant control system.

As is shown in FIG. 1A, the unit comprises a CRT display 1, an high-rank controller 2 connected to the CRT display 1, and a low-rank controller 3. The CRT is connected to the high-rank controller 2, which in turn is connected a network line 7. The low-rank controller 3 is connected between the network line 7 and one of the terminal units 4 of the plant, such as valves, dampers, pumps, and the like.

The CRT display 1 displays has a display screen and a touch screen (not shown) mounted on the displays screen. The display screen (e.g., Graphic Pictorial) displays a system image of the plant, including icons of the terminal units 4. To select any terminal unit, it suffices for an operator to touch that portion of the touch screen which is located on the corresponding icon displayed on the display screen. To be specific, when the operator touches said portion of the touch screen, the CRT display 1 supplies a selection signal So to the high-rank controller 2.

The high-rank controller 2 conveys the selection signal So to the low-rank controller 3 via the network line 7. The controller 2 is designed to control the CRT display 1. It receives a signal Se which the low-rank controller 3 has generated in response to the select signal So and which is either an operable-signal or an abnormal-signal, and conveys this signal Se to the CRT display 1, thus performing feed-back.

The low-rank controller 3 cyclically monitors the condition of the terminal unit 4 (or a valve in the example shown in FIG. 1A). In response to the selection signal So, it generates a signal Se representing the condition of the unit 4. When the terminal unit 4 has a trouble, it supplies an error signal Sv to the low-rank controller 3. Upon receipt of the signal Sv, the controller 3 supplies an abnormal-signal (i.e., signal Se) to the high-rank controller 2 through the network line 7.

The network line 7 is a private LAN (Local Area Network) line or a long-distance, public communication line.

Figure 1B:
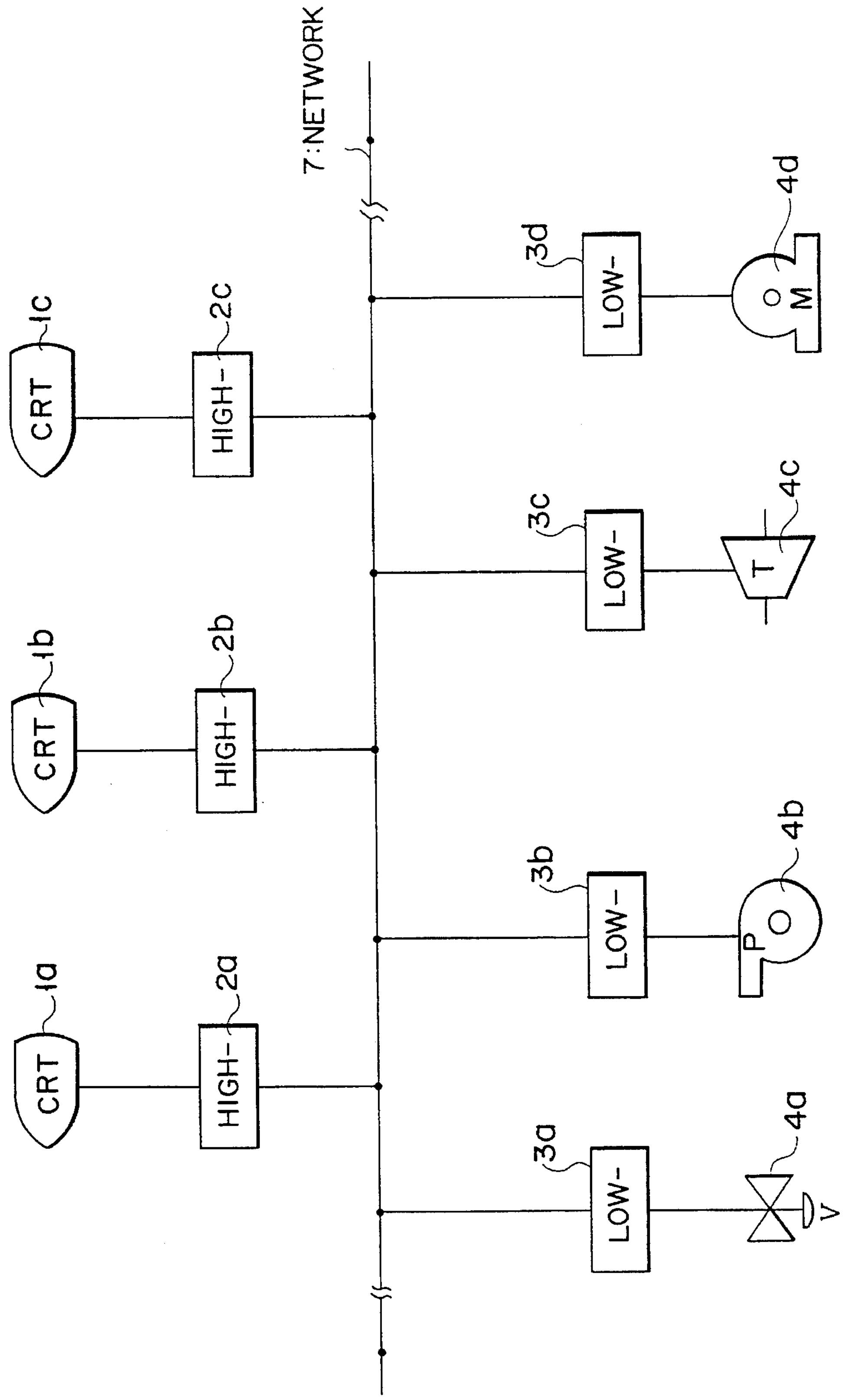
FIG. 1B is a block diagram illustrating a CRT operation apparatus according to the invention, which comprises a plurality of CRT operation units.

FIG. 1B illustrates the CRT operation apparatus which comprises several units identical to the one shown in FIG. 1A and which is designed to use in a system for monitoring and controlling a power-generating plant. The apparatus comprises CRT displays 1*a*, 1*b*, 1*c*, . . . , high-rank controllers 2*a*, 2*b*, 2*c*, . . . . and low-rank controllers 3*a*, 3*b*, 3*c*, 3*d* . . . . The CRT displays 1*a*, 1*b*, 1*c*, . . . are connected to the high-rank controllers 2*a*, 2*b*, 2*c*, . . . , respectively, which are connected to a network line 7. The low-rank controllers 3*a*, 3*b*, 3*c*, 3*d*, . . . are connected to the network line 7. The low-rank controllers are also connected the terminal units 4*a*, 4*b*, 4*c*, 4*d* . . . of a plant, respectively. Alternatively, each low-rank controller may be connected to two or more terminal units.

Figure 1C:
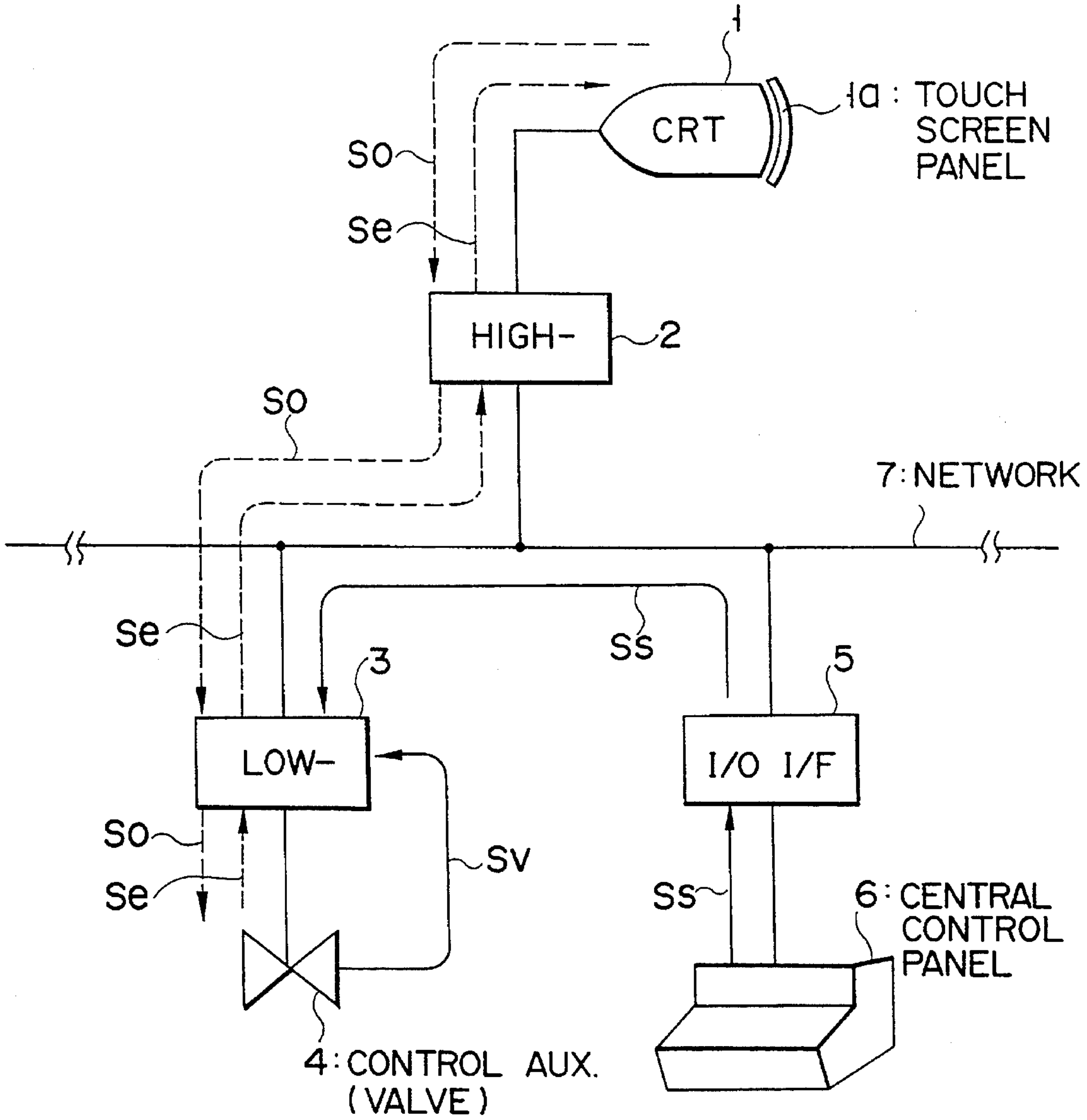
FIG. 1C is a diagram explaining the basic units of another CRT operation apparatus according to the present invention.

FIG. 1C illustrates one of the identical units incorporated in a CRT operation apparatus according to the invention, which is designed for use in a system for monitoring and controlling a plant such as a power-generating plant. This apparatus is different from the apparatus of FIG. 1A only in that a central control panel 6 is connected to a network line 7 by means of an input/output interface 5. Both he input/output interface 5 and the central control panel 6 are of the existing types. The high-rank controller 2 serves to monitor not only the operating condition of the terminal unit 4 connected to the low-rank controller 3, but also the condition of that switch on the panel 6 which is connected to the terminal unit 4. The input/output interface 5 connected to the central control panel 6 cyclically monitors the condition of the switch identified by a selection signal So supplied from the CRT display 1 through the high-rank controller 2 and the network line 7, and supplies a switch-condition signal Ss to the low-rank controller 3 through the network line 7. The interface 5.also determines whether or not the switch is in such a condition as to jeopardize the CRT operation, and supplies a signal Se, which is either a operable-signal or an abnormal-signal, to the high-rank controller 2 via the network line 7.

Also with the CRT operation apparatus shown in FIG. 1C, an operator can monitor and control a plant including the terminal unit 4, in accordance with the system image of the plant displayed by the CRT display 1.

Figure 2:
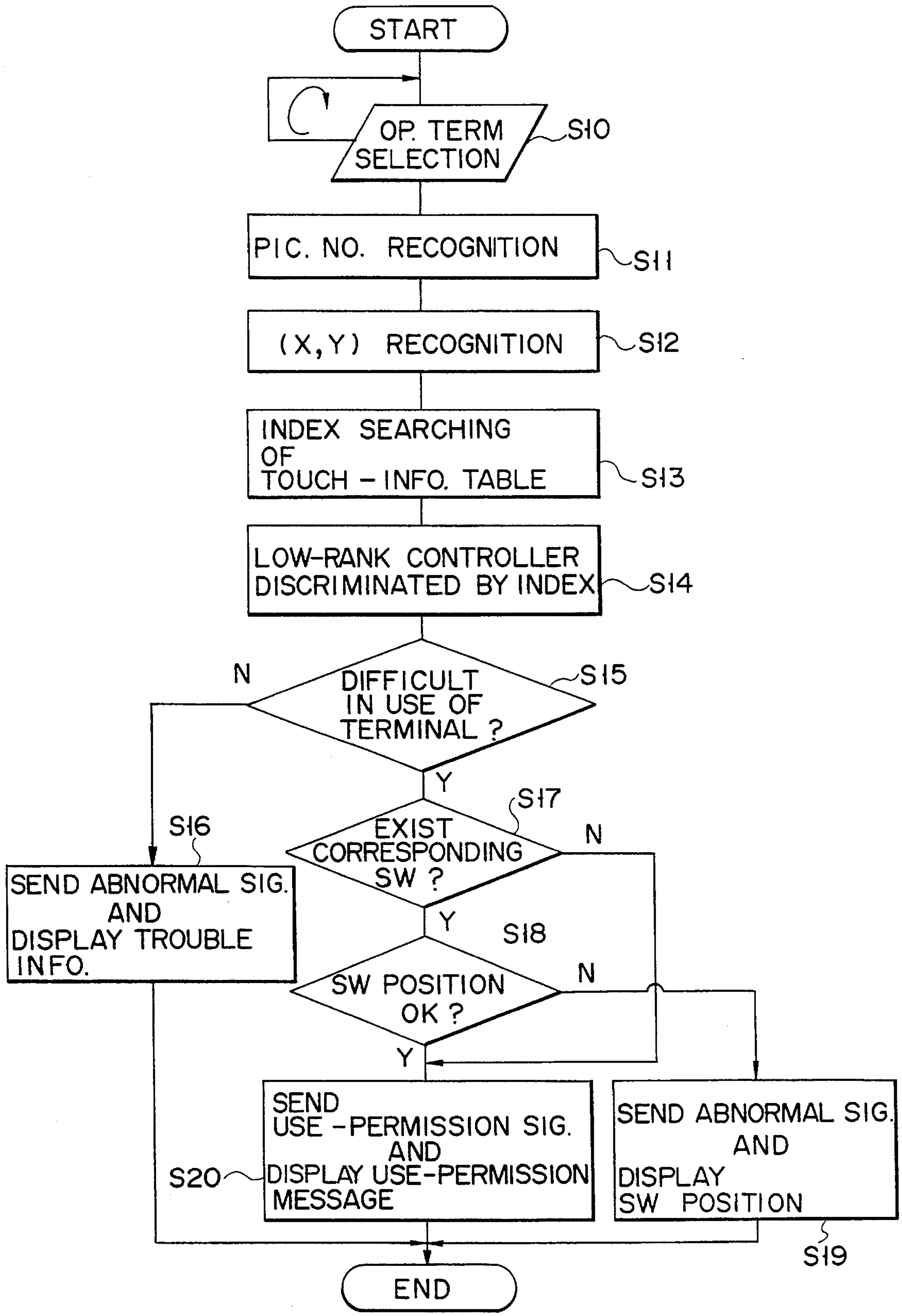
FIG. 2 is a flow chart explaining how the high-rank controller incorporated in the apparatus shown in FIG. 1B performs various operations.

It will now be explained how the high-rank controller 2 of the apparatus shown in FIG. 1C operates, with reference to the flow chart of FIG. 2.

Figure 3:
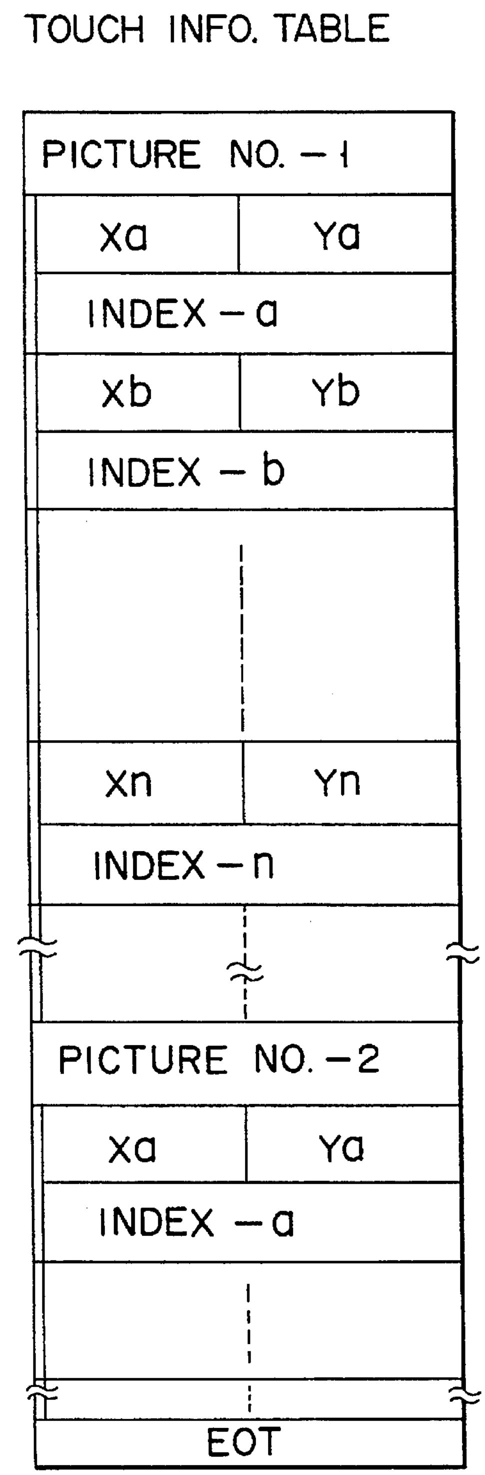
FIG. 3 is a diagram schematically representing the touch data table which is incorporated in the apparatus shown in FIG. 2.

First, in step S10 (a waiting loop), the high-rank controller 2 waits for a selection So from the touch screen 1*a* of the CRT display 1. When the controller 2 receives the signal So for selecting the terminal unit 4, the flow goes to step S11, in which the number of the system image displayed by the CRT display 1 is recognized. In the next step, S12, the X-Y coordinates representing the position which the icon of the unit 4 takes on the CRT screen is recognized. In step S13, an index data item of the selected terminal unit 4 is searched for in a touch-information table (shown in FIG. 3) stored in the controller 2, in accordance with the system image number and the X-Y coordinates, both recognized in step S12, and the index data item is added to the selection signal So. The selection signal So is supplied from the high-rank controller 2 to the network line 7.

In step S14, the low-rank controller 3, to which the selected unit 4 is connected, is selected in accordance with the selection signal So. Also in step S14, the controller 3 identifies the selected terminal unit 4 from the index data item contained in the selection signal So is supplied through the network line 7.

Then, in step S15, in which the low-rank controller 3 determines whether the selected terminal unit 4 is in a normal condition or not, in accordance with the signal Sv supplied from the terminal unit 4 and showing the condition of the unit 4 and also with the signal Ss supplied from the main control panel 6 via the interface 5 and the line 7 and representing the condition of the switch connected to the unit 4. If NO in step S15, the flow goes to step S16, in which the controller 3 supplies an abnormal-signal Se to the high-rank controller 2, which causes the CRT display 1 to display an error message indicating that either the selected unit 4 or the corresponding switch, or both, have troubles. If NO in step S15, the flow advances to step S17, in which the controller 3 determines whether or not the main control panel 6 has a switch provided for the selected terminal unit 4.

If YES in step S17, the flow goes to step S18, in which the low-rank controller 3 determines whether or not the switch is in the correct position. If NO in step S18, the flow advances to step S19, in which the controller 3 supplies the abnormal-signal Se to the CRT display 1 through the high-rank controller 2, whereby the CRT display 1 displays an error massage showing that the switch is in a wrong position. If YES in step S18, the flow goes to step S20, in which the switch-condition signal Ss is supplied to the high-rank controller 2, and the controller 2 supplies a use-permission signal to the CRT display 1, whereby the CRT display 1 displays a message prompting the operator to control the terminal unit 4 he or she has selected.

Figure 4:
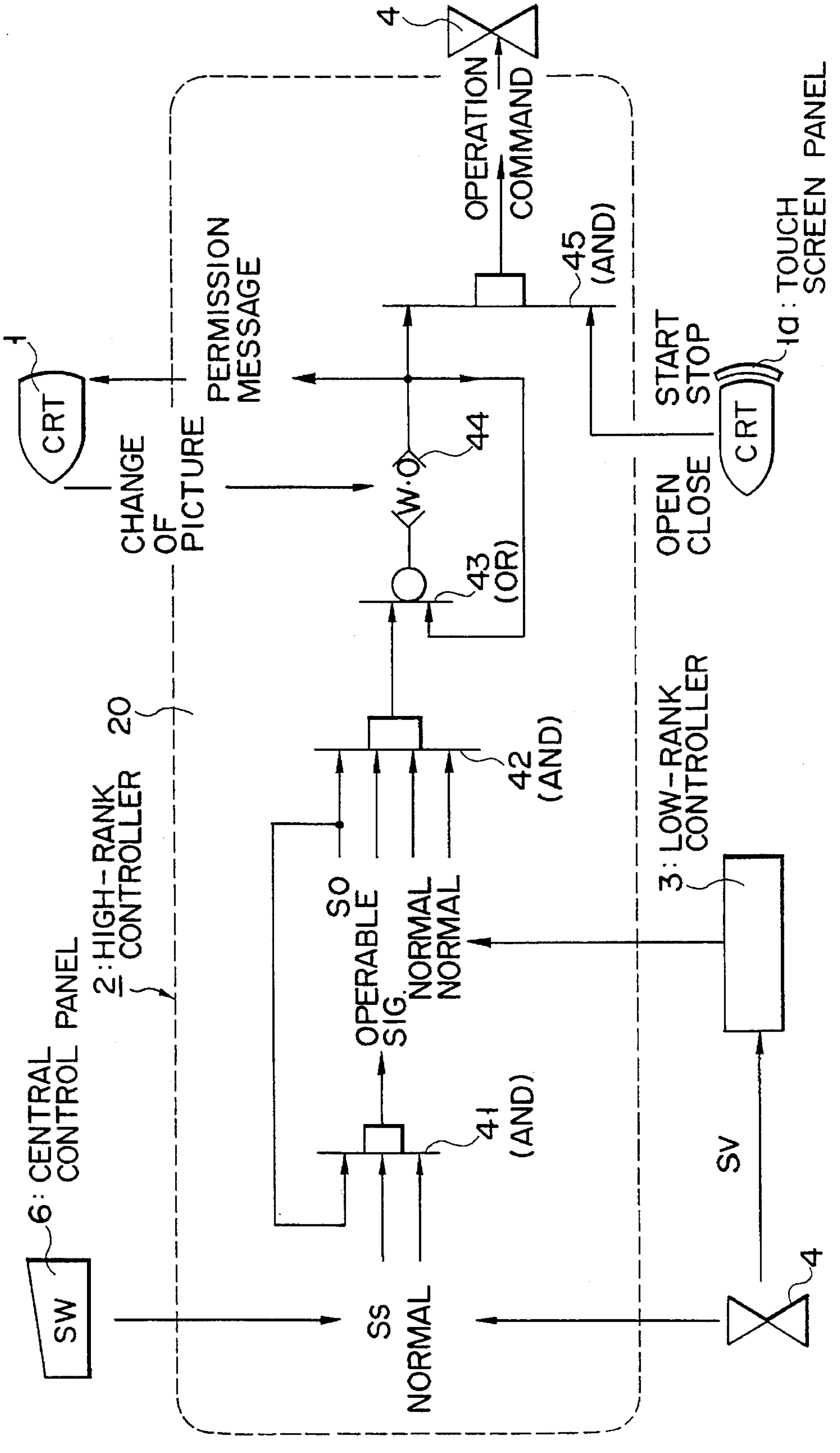
FIG. 4 is a diagram explaining how the electric circuit used in the apparatus operates to identify signals.

It will now be explained how the high-rank controller generates a use-permission signal, and supplies this signal to the CRT display 1, with reference to FIG. 4. In the high-rank controller 1, the selection signal S0, the switch-condition signal Ss (either a normal-position signal or an abnormal-position signal), and the signal Se (either a permission-signal or an abnormal-signal) are supplied to a three-input AND gate 41. If the signals Ss and Se are a normal-position signal and a permission-signal, respectively, the AND gate 41 produces an operable-signal, which is supplied to four-input AND gate 42. The selection signal So, the switch-position signal Ss, and the signal Se are supplied to the remaining three inputs of the AND gate 42. If the signals Ss and Se are a normal-position signal and an operable-signal, the AND gate 42 outputs a use-permission signal to the CRT display 1 the first input terminal of a two-input OR gate 43, and is supplied to the CRT display 1 via a wipe-out logic 44, whereby the CRT display 1 displays a use-permission message. Meanwhile, the use-permission signal is fed back to the second input terminal of the OR gate 43, and is supplied to the first input terminal of a two-input AND gate 45.

When the operator selects a command (e.g., the opening or closing of a valve, or the start or stop of a device) by touching that portion of the touch panel 1a which is located above the icon of this command, this command is supplied to the second input terminal of the AND gate 45 by So. As a result of this, the AND gate 45 produces an operation command, which is supplied to the selected terminal 4 through the network line 7 and the low-rank controller 3. Thereafter, the operator can remote-control the unit 4 by touching the touch panel **1*a***.

As may be understood from the above, the CRT display 1 displays a use-permission message if the following two conditions are satisfied:

(1) The terminal unit 4 is selected.

(2) The unit 4, the switch connected thereto, the high-rank controller 2, and the low-rank controller 3 have no troubles at all.

As has been described, an operation command is supplied to the selected terminal unit 4 when the operator touches the touch screen panel **1*a* while the CRT display 1** is displaying a use-permission message.

On the other hand, if both conditions (1) and (2) are not satisfied, the wipe-out logic 44 ceases to have a hold circuit upon receipt of a picture-change order supplied from the CRT display 1. As long as the CRT display displays no system image of the plant, the AND gate 45 produce no operation commands. In other words, unless the system image displayed, no operation commands are supplied to the terminal units even if the operator touches the touch screen **1*a***. This ensures a reliable CRT operation.

Further, by virtue of the system image displayed by the CRT display 1, the operator can easily understand whether any terminal unit 4 he or she has selected is in normal condition or abnormal condition, and also whether the corresponding switch of the central control panel 6 is in normal condition or abnormal condition. In view of this, the CRT operation apparatus shown in FIG. 1C helps to accomplish a high-reliability operation of a power-generating plant.

As has been described above, the CRT operation apparatus according to the invention comprises a CRT display for displaying an image of a plant; a low-rank controller for controlling the terminal units of the plant; a high-rank controller for supplying various operation commands to the low-rank controller; and means for collecting a data item representing the condition of any terminal unit and a data item showing the condition of the corresponding switch of a central control panel, and supplying these data items as an operable-signal or an abnormal-signal to the CRT display, thereby informing an operator whether the terminal unit can be further operated. Hence, the CRT operation apparatus can, unlike the conventional one, inform the operator whether any selected terminal unit has a trouble or not and also whether or not the corresponding switch is in an abnormal condition.

Even if the terminal units of the plant are controlled by operating a central control panel installed in a central control room, the CRT operation apparatus enables an operator to recognize whether or not not the switches of the central control panel are such conditions as to adversely influence the terminal units. Also in this respect, the CRT display apparatus of the invention helps the operator to perform a high-reliability operation of the plant.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A CRT operation apparatus for controlling a plant having terminal units, said CRT operation apparatus comprising:

CRT display means for displaying a system image of the plant, including icons indicating said terminal units and for selecting one of said terminal units by using said icons;

high-rank controller means, connected to said CRT display means, for supplying operation commands to one of said terminal units selected by said CRT display means;

low-rank controller means, connected to said terminal units, for controlling said terminal units;

network means for connecting said high-rank controller means and said low-rank controller means;

central control means, connected to said network means and having a manual operating member, for supplying operation commands to said terminal units by using the manual operating member;

first detecting means for detecting whether or not one of said terminal units selected by said CRT display means is in trouble;

second detecting means for detecting whether or not the operation command supplied from said CRT means is inconsistent with the operation command supplied from said central control means;

means, when one of said terminal units is selected by said CRT display means, for supplying a first abnormal-signal to said CRT display means if said first detecting means detects that the terminal unit is in trouble, a second abnormal signal to said CRT display means if said second detecting means detects that the operation command supplied from said CRT means is inconsistent with the operation command supplied from said central control means, and a use-permission signal to said display means if said second detecting means detects that the operation command supplied from said CRT means is not inconsistent with the operation command supplied from said central control means and said first detecting means detects that the terminal unit is not in trouble.

2. A CRT operation apparatus for controlling a plant having terminal units, said CRT operation apparatus comprising:

CRT display means for displaying a system image of said plant, including icons indicating said terminal units;

CRT data-input means attached to the front of said CRT display means for inputting data when touched by an operator to select one of said terminal units;

high-rank controller means, connected to said CRT display means, for supplying operation commands to one of said terminal units selected by said CRT data-input means;

low-rank controller means connected to said terminal units, for controlling the terminal units;

network means connected to said high-rank controller means and said low-rank controller means;

central control means, connected to said network means and having a manual operating member, for supplying operation commands to said terminal units by using the manual operating member;

first detecting means for detecting whether or not one of said terminal units selected by said CRT display means is in trouble;

second detecting means for detecting whether or not the operation command supplied from said CRT means is inconsistent with the operation command supplied from said central control means;

means, when one of said terminal units is selected by said CRT display means, for supplying a first abnormal-signal to said CRT display means if said first detecting means detects that the terminal unit is in trouble, a second abnormal signal to said CRT display means if said second detecting means detects that the operation command supplied from said CRT means is inconsistent with the operation command supplied from said central control means, and a use-permission signal to said display means if said second detecting means detects that the operation command supplied from said CRT means is not inconsistent with the operation command supplied from said central control means and said first detecting means detects that the terminal unit is not in trouble.

3. A CRT operation apparatus for controlling a plant having a plurality of terminal units, said CRT operation apparatus comprising:

CRT display means for displaying a system image of said plant, including icons indicating said terminal units;

CRT data input means attached to the front of said CRT display means for inputting data when touched by an operator and for selecting one of said terminal units;

high-rank controller means, connected to said CRT display means, for controlling the low-rank controller means and for supplying operation commands to one of said terminal units selected by said CRT data input means;

low-rank controller means, connected to said terminal units, for controlling said terminal units;

network means connected to said high-rank controller means and said low-rank controller means;

central control means, connected to said network means and having a manual operating member, for supplying operation commands to said terminal units by using the manual operating member;

first detecting means for detecting whether or not one of said terminal units selected by said CRT display means is in trouble;

second detecting means for detecting whether or not the operation command supplied from said CRT means is inconsistent with the operation command supplied from said central control means;

means, when one of said terminal units is selected by said CRT display means, for supplying a first abnormal-signal to said CRT display means if said first detecting means detects that the terminal unit is in trouble, a second abnormal signal to said CRT display means if said second detecting means detects that the operation command supplied from said CRT means is inconsistent with the operation command supplied from said central control means, and a use-permission signal to said display means if said second detecting means detects that the operation command supplied from said CRT means is not inconsistent with the operation command supplied from said central control means and said first detecting means detects that the terminal unit is not in trouble.

4. A CRT operation apparatus for controlling a plant having a plurality of terminal units, said CRT operation apparatus comprising:

CRT display means for displaying a system image of said plant, including icons indicating said terminal units and for selecting one of said terminal units by using said icons;

high-rank controller means connected to said CRT display means, for controlling the low-rank controller means and supplying operational commands to one of said terminal units selected by said CRT display means;

low-rank controller means, connected to said terminal units, for controlling said terminal units;

network means connected to said high-rank controller means and said low-rank controller means;

central control means, connected to said network means and having a manual operating member, for supplying operation commands to said terminal units by using the manual operating member;

first detecting means for detecting whether or not one of said terminal units selected by said CRT display means is in trouble;

second detecting means for detecting whether or not the operation command supplied from said CRT means is inconsistent with the operation command supplied from said central control means;

means, when one of said terminal units is selected by said CRT display means, for supplying a first abnormal-signal to said CRT display means if said first detecting means detects that the terminal unit is in trouble, a second abnormal signal to said CRT display means if said second detecting means detects that the operation command supplied from said CRT means is inconsistent with the Operation command supplied from said central control means, and a use-permission signal to said display means if said second detecting means detects that the operation command supplied from said CRT means is not inconsistent with the operation command supplied from said central control means and said first detecting means detects that the terminal unit is not in trouble.

5. The CRT operation apparatus according to claim 4, wherein operation commands are supplied to any specific terminal unit through said low-rank controller means, said specific terminal unit having been selected by operating said CRT data input means, and said low rank controller means collects signals representing the conditions of said terminal units and supplies these signals to said CRT display means via said network line and said high-rank controller means, thereby to display the conditions of the terminal units by means of said CRT display means.

* * * * *